United States Patent [19]

Kaule et al.

[11] 4,452,843
[45] Jun. 5, 1984

[54] SECURITY PAPER

[75] Inventors: Wittich Kaule, Gauting; Gerhard Schwenk, Puchheim; Gerhard Stenzel, Munich, all of Fed. Rep. of Germany

[73] Assignee: GAO Gesellschaft fur Automation und Organisation mbH., Munich, Fed. Rep. of Germany

[21] Appl. No.: 314,844

[22] PCT Filed: May 29, 1981

[86] PCT No.: PCT/DE81/00078
§ 371 Date: Oct. 23, 1981
§ 102(e) Date: Oct. 23, 1981

[87] PCT Pub. No.: WO81/03507
PCT Pub. Date: Dec. 10, 1981

[30] Foreign Application Priority Data

May 30, 1980 [DE] Fed. Rep. of Germany ....... 3020600
Jun. 13, 1980 [DE] Fed. Rep. of Germany ....... 3022329

[51] Int. Cl.³ ................... B32B 23/00; B32B 3/00; G01J 1/00; D21H 5/10
[52] U.S. Cl. .................................. 428/199; 428/375; 428/333; 428/323; 428/908; 428/204; 428/207; 428/211; 428/403; 428/464; 428/438; 428/537; 428/690; 428/913; 428/917; 428/918; 428/915; 356/71; 250/367; 283/92; 101/DIG. 25; 162/140; 428/537.7
[58] Field of Search ............... 428/403, 464, 438, 537, 428/690, 913, 916, 917, 918, 199, 204, 207, 333, 323

[56] References Cited

U.S. PATENT DOCUMENTS

| 3,447,851 | 6/1969 | Remeika et al. ............. 252/62.57 X |
| 3,455,577 | 7/1969 | Kikumoto . |
| 3,473,027 | 10/1969 | Freeman et al. . |
| 3,480,877 | 11/1969 | Dillon et al. . |
| 3,525,698 | 8/1970 | Leto et al. . |
| 3,919,447 | 11/1975 | Kilmer, Jr. et al. ............. 428/916 X |
| 3,928,225 | 12/1975 | McDonough et al. ......... 428/916 X |
| 4,047,033 | 9/1977 | Malmberg . |
| 4,128,674 | 12/1978 | Hedler ............................. 428/403 X |
| 4,146,792 | 3/1979 | Stenzel . |
| 4,202,491 | 5/1980 | Suzuki . |
| 4,246,128 | 1/1981 | Gallagher et al. .............. 252/62.57 |

FOREIGN PATENT DOCUMENTS

| 449133 | 8/1927 | Fed. Rep. of Germany . |
| 497037 | 4/1930 | Fed. Rep. of Germany . |
| 1599011 | 2/1972 | Fed. Rep. of Germany . |
| 2547768 | 7/1976 | Fed. Rep. of Germany . |
| 2745301 | 4/1979 | Fed. Rep. of Germany . |
| 2903073 | 8/1979 | Fed. Rep. of Germany . |
| 2041827 | 9/1980 | United Kingdom ................ 428/916 |

Primary Examiner—P. Ives
Attorney, Agent, or Firm—Schwartz, Jeffery, Schwaab, Mack, Blumenthal & Koch

[57] ABSTRACT

Security papers with luminescing authenticity characteristics built in or printed thereon which absorb in the visible region of the optical spectrum but in the infrared have a transparent region in which the luminophore also emits. By the absorption in the visible undesired parasitic emissions are suppressed which would make the luminophore visually evident on corresponding excitation. For testing the authenticity of the document the emission is investigated in the infrared. Suitable luminophores are rare earth metal luminophores in suitable host lattices, particularly in ferrite lattices or garnet lattices, which contain transition metal ions as absorbing elements.

33 Claims, 6 Drawing Figures

SECURITY PAPER

BACKGROUND OF THE INVENTION

The present invention relates to a security paper with authenticity features in the form of luminescing substances on the basis of host lattices doped with rare earth metals.

Under the term "security paper" are to be understood here bank notes, check forms, shares and stamps as well as passes, credit cards, check cards, passports, air tickets and other certificates and documents.

Rendering security paper secure against forgery by means of luminescing substances has already been known for a long time. Already in German Patent Specification 449,133 from the year 1925 and German Patent Specification 497,037 from the year 1926 the introduction of luminescing substances into security papers is described, wherein the luminophores are excitable with ultraviolet or other invisible rays and emit in the visible region.

In U.S. Pat. Nos. 3,473,027 and 3,525,698 luminophores and their use as coding dyestuffs on the basis of host lattices doped with rare earth metals, which if appropriate can be co-activated, are described, in which the excitation can take place in the UV-region and shortwave visible region and the emission in the visible or IR-region, wherein the emission in the IR-region finds use in broadening the usable spectral region.

The co-activated ytterbium-erbium rare earth metal doped luminophores described in German Offenlegungsschrift 2547768 are excited in the IR-region and emit in the visible region.

The use of luminophores for rendering data carriers secure is further described in German Offenlegungsschrift 1599011 as well as in German Offenlegungsschrift 2903073, wherein the luminescent materials there described are excited and emit in the IR-region.

In the patent literature and the scientific literature a very large number of various rare earth metal luminophores are described which as single crystals are suitable for solid body lasers and other purposes. For example attention can be directed to U.S. Pat. Nos. 3,447,851 and 3,480,877 in which crystals with garnet structure are described for laser techniques and for other purposes, but the rendering of security papers secure with luminophores is not mentioned.

From the state of the art concerning rendering security papers secure with luminescing substances it can be concluded that the excitation of the luminophores takes place in the non-visible region i.e. in the UV- or IR-region while the emission in the visible spectrum is either desired or not seen as damaging.

The luminophores are in security papers included as paper additions, as paper insertions, for example as mottling fibres or security threads, or in printing inks.

It has emerged that in rendering security papers secure with rare earth metal luminophores difficulties arise on account of their properties described in what follows. In more recent publications generally "data cards" are described i.e. generally multi-layer security papers in which these difficulties can be avoided e.g. by thick screen printing layers, foil embedding or the like.

Difficulties in rendering security papers secure, particularly bank notes, using rare earth metal luminophores arise from their particle size. In the publications already noted above namely U.S. Pat. No. 3,473,027 and German Offenlegungsschrift 2547768 particle sizes of a few $\mu m$ upwards are noted. For normal printing pigments, however, particle sizes below 1 $\mu m$ are necessary. Normal previously used rare earth metal luminophores on comminution to below a certain particle size no longer display sufficient effectiveness. They must accordingly be introduced in large quantities; this gives rise to high costs and often leads to insoluble technological problems, since for this the limit of loading of the printing ink with additional materials has to be exceeded.

For avoiding these difficulties in relation to particle size, partly soluble organic rare earth metal luminophores are described, which, however, because of their nature do not have the solvent fastness necessary for bank note printing.

In the rendering of security papers secure up till now particular value has been laid on the fact that on excitation in the UV- or IR-region luminescence arose in the visible region or in the near IR-region easily accessible with commercial image converters. In automatic authenticity checking of security papers however an additional security factor is present if the security feature is not visible or it is not possible to make it visible with conventional means.

In German Offenlegungsschrift 1599011 for masking inscriptions covering with a foil has already been proposed. Apart from the fact that the foil itself is visible and thereby directs attention particularly to the place of the inscription, covering with foils in the case of bank notes and similar security papers is inappropriate.

SUMMARY OF THE INVENTION

The object of the invention is the creation of security papers with a security in the form of luminescing substances which are as difficult as possible to detect and specifically show no emission in the visible region and which can be introduced in small quantities.

BRIEF DESCRIPTION OF THE DRAWINGS

The present invention will become more clearly understood in connection with the detailed description to follow in which like reference numerals represent like parts throughout and in which.

DETAILED DESCRIPTION OF THE PREFERRED EMBODIMENT

Figure 1:
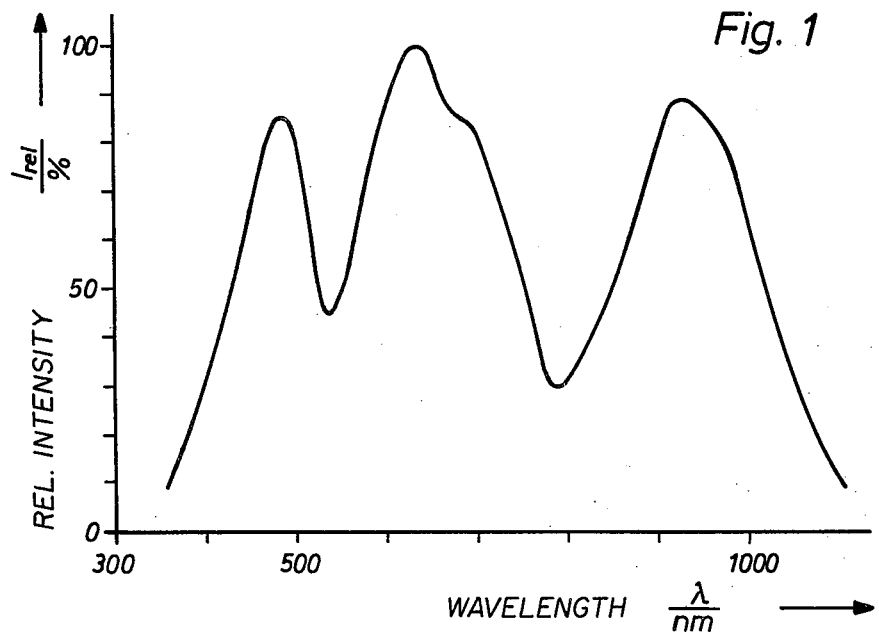
FIG. 1 is a graph representing the excitation spectrum of a luminophore made in accordance with Example 1.

The subject of the invention is a security paper with luminescing substances on the basis of host lattices doped with rare earth metals which is characterised in that the host lattice absorbs essentially in the whole visible region and if appropriate additionally in the near IR and can be excited in substantial portions of the visible or of the near IR-region, and in the IR has an optically transparent region in which the substance exclusively emits.

The host lattice contains as absorbing lattice components preferably a transition metal, particularly a metal from the sub groups VI, VII and VIII of the Periodic Table of the Elements. Particularly suitable are cobalt, nickel, manganese and iron, wherein the host lattice preferably has a perovskite or garnet structure.

The optically transparent region of the optical window of the host lattice preferably lies between 1.1 and 10 μm or 0.7 and 10 μm.

Emissions lying outside the optical window and particularly in the visible or near IR-region are suppressed by the absorption property of the host lattice. For example with an optical window of 1.1 to 8 μm and an absorption region of 0.3 to 1.1 μm all emission lines in the visible region and in the near IR-region which is available with a normal commercial image converter are suppressed. In this way it is ensured that on each excitation of the luminophore no emission can arise in the visible region and the easily available IR-region and accordingly the security feature is absolutely "invisible" or determining a pattern is not possible even with the use of normal technical means.

The use of rare earth metal luminophores with lattices absorbing in the whole visible region was previously only proposed for lasers. This suggestion however found no technical use. For this reason normal commercial availability of the luminescing substances introduced into the security papers according to the invention is excluded.

The excitation region lies in the visible and if appropriate additionally in the near IR. This region overlaps with the radiation regions of strong light sources such as halogen lamps, flash lamps and xenon arc lamps. For this reason in the security papers according to the invention very small quantities of material can be used. Because of the small quantities of materials required working into printing inks customary for security papers is possible. Furthermore because of the small quantity of material detection, for example by chemical analysis, is rendered extraordinarily difficult.

In customary "transparent", i.e. low absorption in the visible range, crystalline rare earth metal luminophores comparatively large crystals are necessary for an effective excitation and emission. With small particle sizes the effectiveness rapidly drops off and at particle sizes below 1 μm sinks to impracticably low values. In the strongly absorbing rare earth metal luminophores used in the security papers according to the present invention, the excitation as such takes place only in a comparatively thin layer. Comminution of the crystals below 1 μm accordingly does not diminish the effectiveness. The luminophores can, because of their low particle size, be used in simultaneous printing and steel gravure printing inks.

The absorbing host lattice components can be substituted partly by non-absorbing host lattice components such as, for example, aluminium, vanadium, gallium and indium. The properties of suppression of luminescence in the visible region and the excitation spectrum matched to the strong light sources are maintained. The absorption of the material becomes less and this accordingly permits it also to be used as an additive for lighter color tones. The small effectiveness of the less absorbing luminophore which can occur is compensated for by the smaller disturbing absorption of the lighter coloring material. Dark colors in contrast take away much excitation light, i.e. one needs very effective strongly absorbing dark luminophores for rendering the security feature secure.

Less strongly absorbing host lattices, in which the absorbing host lattice components are replaced partly by non-absorbing lattice components can also be used in the case of paper additives. In this case light additives are desired which in the determination of the paper color are not noticeably damaging. Since here particle sizes of 20 μm can easily be worked in, a diminished absorption coefficient is compensated for by the larger particle dimensions.

The absorbing radiation intensity $I_{abs}$ behaves relative to the instant intensity $I_O$ according to $$I_{abs}/I_O = 1 - e^{-ad}$$

a = absorption coefficient
d = light penetration depth.

From the equation it follows that with a particle size of 20 μm in place of 1 μm, an absorption coefficient smaller by a factor of 20 suffices in order to absorb per particle the same quantity of light.

Less strongly absorbing host lattices allow, according to the above-noted equation, with thin layers, most of the excitation light to pass through without effect. In the case of strongly absorbing host lattices the impinging light is substantially wholly absorbed and in the case of high quantum efficiencies substantially wholly converted into luminescence light. Luminophores with strongly absorbing host lattices are accordingly to be recommended both for printing processes with a small ink uptake, e.g. offset printing, and also for rendering security papers secure by evaporation and sputtering.

Preferably, in the security papers according to the invention, luminescing substances are used which are solvent fast and which correspond to all the resistance tests described in relation to bank note inks. With less high requirements on resistance however naturally also other materials can be used which do not fulfil all of these requirements normal in bank note manufacture.

As already mentioned, the excitation spectrum of the luminophores used in the security papers according to the invention is optimally matched to the spectral radiation distribution of light sources with a good degree of efficiency, which can be constructed compactly and which can be operated in uncomplicated fashion such as for example halogen lamps and xenon flash lamps. By the broad absorption region of the luminophore the radiation intensity of these light sources is maximally used.

The excitation takes place in the luminophores via the absorbing host lattice. The energy is transferred to the rare metal ions. The mission takes place at the corresponding emission lines of the rare earth metal ions.

The host lattice should absorb essentially in the whole of the visible region and if appropriate additionally in the near IR-region. It is not necessary that the host lattice absorbs totally in the whole visible region. It is sufficient rather that the absorption takes place in each region where a visible emission or if appropriate an emission lying in the near IR can arise. Also a diminished absorption of the host lattice in given spectral regions is sufficient so long as it is ensured that by the absorption of the host lattice possible emissions in the visible are avoided. The desired properties of the luminophores are in each case accordingly present if, in the visible and if possible also the near IR-region, no emissions arise and, accordingly, the security feature is "invisible" or cannot be observed with commercially normal apparatus such as image converters.

Under "near IR" is to be understood here the spectral range of longwave visible light up to 1.1 μm. This region is accessible by commercially available image converters.

The active dopants are rare earth metals particularly elements with atomic number 58 to 71 which have emission lines in the IR-region. Preferred dopants are individual or several of the materials erbium, holmium, thulium and dysprosium.

Preferably the luminophores have a perovskite or a garnet structure.

Among perovskites are to be understood here compounds of the general formula $$AXO_3$$

wherein
A represents a rare earth metal and/or bismuth, and
X one or more absorbing transition metals preferably cobalt, nickel, manganese or iron.

As mentioned already the host lattice can be a mixed lattice of an absorbing and non-absorbing lattice of the same structure i.e. the absorbing transition metal X can partly be replaced by other elements. Particularly there are in question trivalent elements such as aluminum, gallium, indium and scandium as well as tetravalent together with divalent elements such as silicon or germanium with calcium, magnesium and/or zinc.

As garnets are denoted here particularly compounds of the general formulae F1 to F4 subsequently set out.

F1: $A_3X_{5-2x}M_xM'_xO_{12}$
F2: $A_{3-x}B_xX_{5-x}M_xO_{12}$
F3: $A_3Fe_{5-x}M_xO_{12}$
F4: $A_{3-2x}B_{2x}X_{5-x}V_xO_{12}$

In this
A represents in all cases: one or several rare earth metals with the exception of neodymium, praseodymium and lanthanum. The latter elements can be present only as components of a mixture. As component of a mixture also bismuth can be present.
X in all cases: an element from the group iron, aluminum, gallium and indium.
M' an element of the group silicon, germanium, tin and zirconium.
M for F1: an element from the group iron, cobalt, nickel, manganese and zinc,
for F2: an element from the group silicon, germanium, tin, tellurium, zirconium and titanium,
for F3: an element from the group aluminum, gallium, indium and chromium,
B an element from the group magnesium, calcium, strontium, barium, manganese, zinc and cadmium.

As the formulae F1, F2 and F4 show, the formation of "mixed garnets" is not limited only to the mutual replacement of elements of degree of oxidation 3. In F1 and F2 both 2-valent and also 4-valent elements are inserted together into the lattice, wherein by the stoichiometry given the necessary charge equivalence is obtained; in F4 the same goes for the introduction of 2-valent and 5-valent elements; in contrast F3 describes the exchange of iron by 3-valent elements for which no charge balance needs to take place.

The index x can take values between 0 and at most 5 wherein this value is limited by the stoichiometry and it must be ensured that an absorbing component is present. Preferred examples of "mixed garnets" for the cases F1 to F4 are for F1: $Y_3Fe_4Ni_{0.5}Ge_{0.5}O_{12}$
for F2: $Y_2CaFe_4SiO_{12}$
for F3: $Y_3Fe_3Al_2O_{12}$
for F4: $YCa_2Fe_4VO_{12}$ It is to be understood that these lattices in order to achieve luminescence must still be doped with the ions of the rare earth metals.

A further suitable group of compounds are ferrites doped with rare earth metals of the general formula $$M_{1-x}^{2+}M'^{3+}_xFe_x^{2+}Fe_{2-x}^{3+}O_4,$$

wherein M stands for one or more divalent metals from the group indium, cadmium, cobalt, manganese, iron, nickel, copper, magnesium and M' for one or more trivalent lanthanides (atomic number 58–71) such as ytterbium, erbium, thulium, dysprosium, holmium, gadolinium or samarium. In this case for charge compensation the trivalent iron is replaced more or less by iron of oxidation state 2, the index can take values between 0 and 1.

Suitable luminophores for the security papers according to the invention are subsequently described closer with reference to Examples.

EXAMPLE 1

Manufacture of erbium-activated yttrium-iron-indium mixed garnet $Y_{2.8}Fe_4InO_{12}:Er_{0.2}$ 63.22 g yttrium oxide $Y_2O_3$, 7.65 g erbium oxide $Er_2O_3$, 64 g iron oxide $Fe_2O_3$, 27.76 g indium oxide $In_2O_3$ and 60 g anhydrous sodium sulphate $Na_2SO_4$ were intimately mixed, heated in an aluminum oxide crucible for 6 hours to 840° C., milled again and heated for a further 14 hours to 1100° C.

After cooling the reaction product was comminuted, the fluxing agent washed out with water and the product dried in air at 100° C. For obtaining the highest particle fineness possible the powder was finally milled in a stirring ball mill.

A light green powder was obtained with an average particle size of less than 1 μm.

Figure 2:
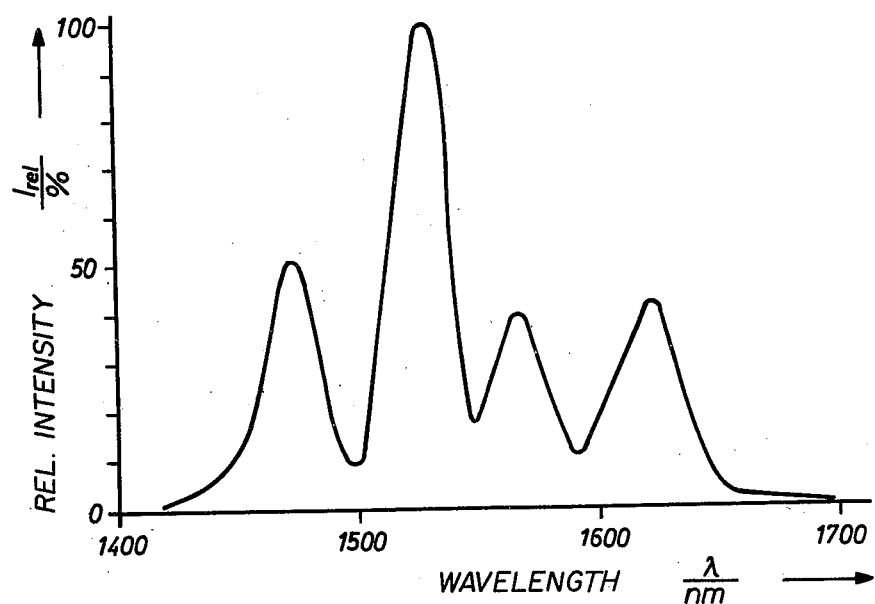
FIG. 2 is a graph representing the luminescence spectrum of the luminophore of Example 1.

On excitation with visible light this luminophore, which has an excitation spectrum evident from FIG. 1, showed no luminescence in the visible region but, as evident from FIG. 2, a particularly strong luminescence emission with characteristic structure at about 1.5 μm in the IR-region where the host lattice is optically transparent. Also on excitation in the UV- and IR-region no luminescences could be observed in the visible region.

In contrast normal luminophores doped with erbium with a transparent host lattice show a green luminescence at 0.52 to 0.55 μm. In the luminophores used according to the invention this green luminescence does not arise on account of the host lattice absorbing in the visible region. The remaining infrared luminescence at about 1.5 μm is more intensive than with normal transparent host lattices. This fluorescence also lies outside the near IR-region available with commercially normal image converters.

Figure 5:
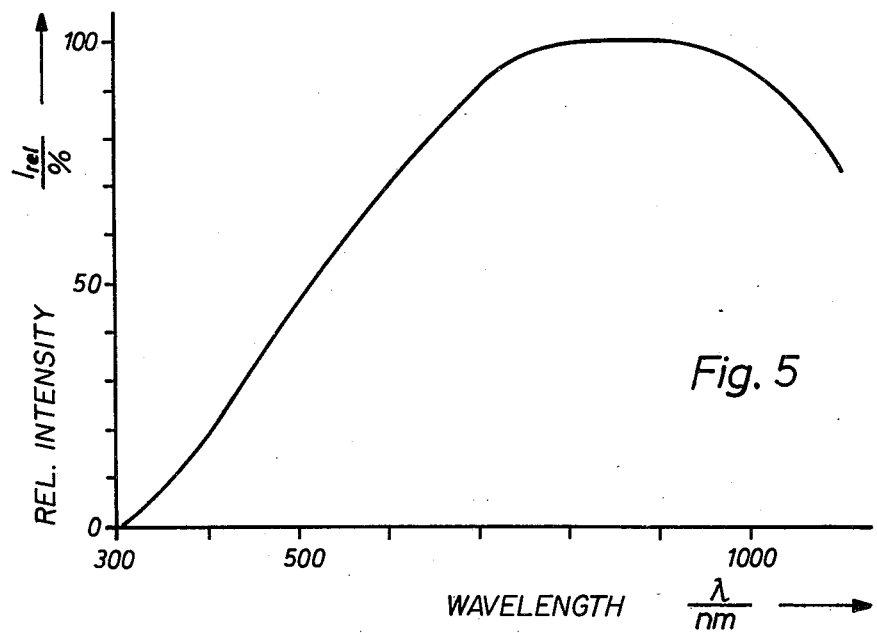
FIG. 5 is a graph representing the spectral irradiation distribution of a halogen incandescent lamp.
Figure 4:
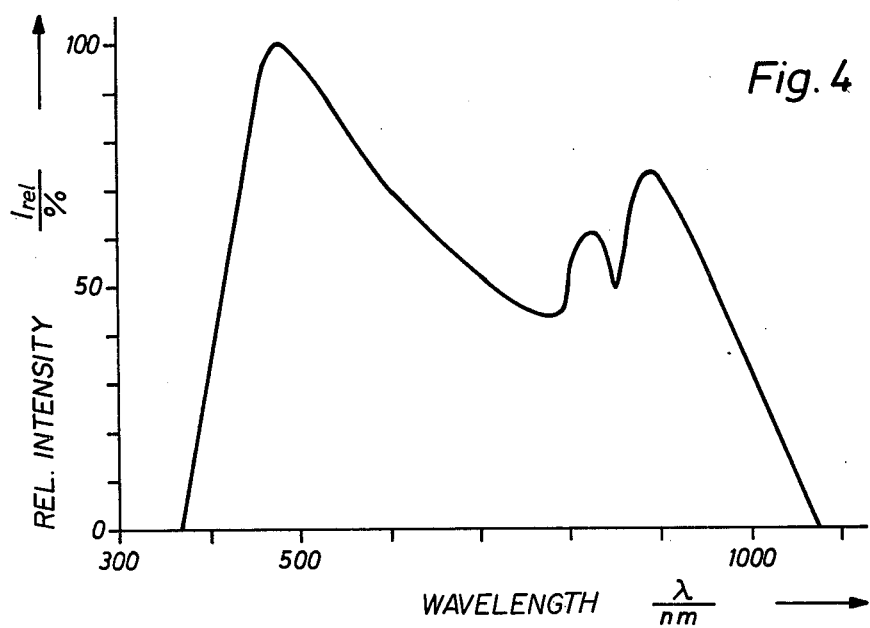
FIG. 4 is a graph representing the spectral irradiation distribution of a xenon flash tube.

In FIG. 4 the spectral irradiation distribution of a xenon flash lamp and in FIG. 5 the spectral radiation distribution of a halogen incandescent lamp are shown. The excitation spectrum (FIG. 1) allows it to be seen that this is optimally matched to the noted strong light sources.

EXAMPLE 2

Manufacture of $Y_{0.8}MnO_3:Er_{0.2}$ 18.06 g yttrium oxide $Y_2O_3$, 7.65 g erbium oxide $Er_2O_3$ and 17.39 g manganese dioxide $MnO_2$ were mixed intensively with one another in an agate mill, filled into a platinum crucible and heated for 96 hours to 900° C. A black powder was obtained which on excitation in the visible and near infrared showed a luminescence at 1.5 μm but no emission in the visible region.

Figure 3:
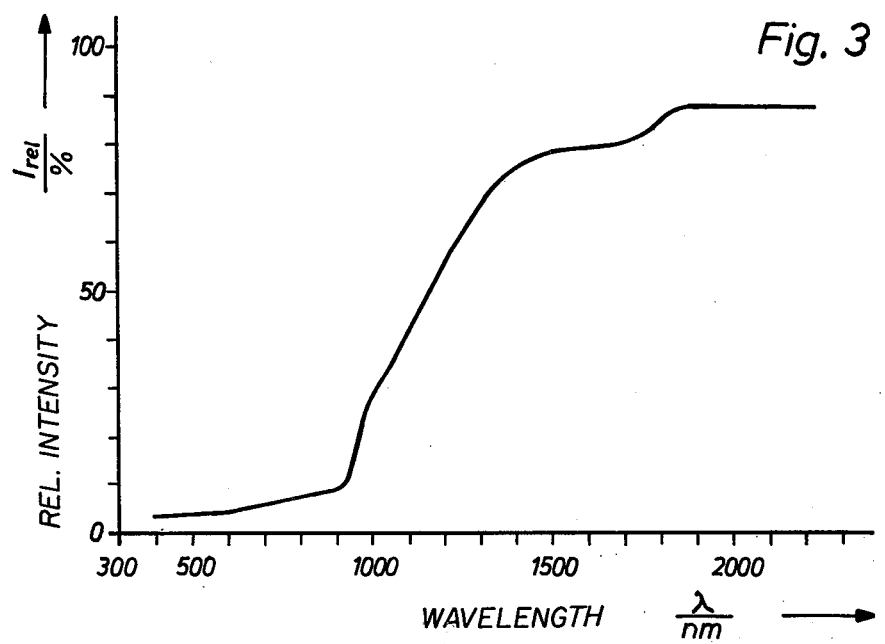
FIG. 3 is a graph representing the remission spectrum of a luminophore made in accordance with Example 2.

The remission spectrum of this luminophore is shown in FIG. 3. From this it is evident that a strong absorption is present in the visible region up to about 1000 nm and that thereafter an optical window is adjacent in the IR-range.

EXAMPLE 3

Manufacture of $Y_{0.8}CoO_3:Er_{0.2}$ 18.06 g yttrium oxide $Y_2O_3$, 7.65 g erbium oxide $Er_2O_3$ and 16 g cobalt oxide $Co_3O_4$ were treated as under Example 2. A grey-black powder was obtained which on excitation in the visible and near infrared showed a luminescence at 1.5 μm but no emission in the visible region.

EXAMPLE 4

Manufacture of $Y_{0.8}CoO_3:Ho_{0.2}$

Analogous to Example 3; the erbium oxide was replaced by 7.56 g holmium oxide $Ho_2O_3$.

A grey-black powder was obtained which on excitation in the visible and near infrared showed a luminescence at 2 μm but no emission in the visible region.

EXAMPLE 5

Manufacture of $ErFeO_3$ 19.17 g erbium oxide $Er_2O_3$, 7.99 g iron oxide $Fe_2O_3$ and 9 g anhydrous sodium sulphate $Na_2SO_4$ were carefully mixed and calcined in an aluminum oxide crucible for 14 hours at 1100° C. After cooling the sodium sulphate was washed out with water and the residue dried in air at 100° C. An ocher colored pigment was obtained which on excitation in the visible and near infrared showed a luminescence at 1.5 μm but no emission in the visible region.

EXAMPLE 6

Manufacture of $Er_{0.8}FeO_3:Ho_{0.2}$ 30.6 g erbium oxide $Er_2O_3$, 7.6 g holmium oxide $Ho_2O_3$ 16 g iron oxide $Fe_2O_3$ and 31 g anhydrous sodium sulphate $Na_2SO_4$ treated as described under Example 4. An ocher colored pigment was obtained which on excitation in the visible and near infrared showed a luminescence at 1.5 μm and 2 μm but no emission in the visible region.

EXAMPLE 7

Manufacture of $Yb_{0.8}FeO_3:Ho_{0.2}$ 31.5 g ytterbium oxide $Yb_2O_3$, 7.6 g holmium oxide $Ho_2O_3$, 16 g iron oxide $Fe_2O_3$ and 28 g sodium sulphate $Na_2SO_4$ were treated as described under Example 5 but calcined for 60 hours at 1100° C.

A dark brown powder was obtained which on excitation in the visible and near infrared showed a luminescence at 2 μm but no emission in the visible region.

EXAMPLE 8

Manufacture of $Y_{0.8}NiO_3:Er_{0.2}$ 18.06 g yttrium oxide $Y_2O_3$, 7.65 g erbium oxide $Er_2O_3$ and 14.95 g nickel oxide NiO were carefully mixed, filled into platinum boats and heated in a quartz tube under pure oxygen for 48 hours to 1150° C. A light green powder was obtained which on excitation in the visible and near infrared showed a luminescence at 1.5 μm but no emission in the visible region.

EXAMPLE 9

Manufacture of $Gd_{2.8}Fe_5O_{12}:Tm_{0.2}$ 101.5 g gadolinium oxide $Gd_2O_3$, 7.72 g thulium oxide $Tm_2O_3$, 79.9 g iron oxide $Fe_2O_3$ and 65 g sodium sulphate $Na_2SO_4$ were worked up as described in Example 8. A green powder was obtained which on excitation in the visible and near infrared showed a luminescence at 1.8 μm but no emission in the visible region.

EXAMPLE 10

Manufacture of $Gd_{2.95}Fe_2Ga_3O_{12}:Dy_{0.05}$ 106.94 g gadolinium oxide $Gd_2O_3$, 1.86 g dysprosium oxide $Dy_2O_3$, 31.9 g iron oxide $Fe_2O_3$, 56.3 g gallium oxide $Ga_2O_3$ and 65 g anhydrous sodium sulphate $Na_2SO_4$ were carefully mixed, filled into an aluminum oxide crucible and calcined for 14 hours at 1100° C. After cooling the reaction product was comminuted, the fluxing agent washed out with water and the residue dried at 100° C. in air. For achieving the highest particle fineness possible the powder was then milled in a stirring ball mill. A light green powder was obtained with an average particle size of about 1 μm which on excitation in the visible and near infrared showed a luminescence at 2.7 μm but no emission in the visible region.

As evident for example from the excitation and emission spectra belonging to the first Example, for all noted security materials according to the invention the broad excitation spectrum in the visible which extends partly into the near UV and near IR is characteristic. In this excitation region the emission regions belonging to the dopants are suppressed. The trivalent rare earth metal ions noted in the Examples have in customary host lattices (not absorbing in this region) on UV excitation the following emission colors: dysprosium ($Dy^{3+}$) yellow, thulium ($Tm^{3+}$) blue, holmium ($Ho^{3+}$) orange red, erbium ($Er^{3+}$) green. In the pigments according to the invention these emissions do not arise. The Examples are so chosen that not only in the visible region but also in the near IR-region in which image converters work no emissions arise.

The security papers according to the invention can be provided with the luminophores in manifold fashion. Luminophores can be introduced into the printing inks, into the paper or in a security thread. The introduction into the paper itself is thus possible because the paper over broad regions of the IR shows no absorption. Of particular importance is that the luminophores because of their particle fineness and high effectiveness can also be used in guilloche printing.

Subsequently the manufacture of offset printing inks with the luminophores used according to the invention is described by way of example.

100 g of oil-modified urethane alkyd resin, 10 g zircon octoate, 60 g scouring paste, 160 g bleached linseed oil, 250 g phenol-modified colophony resin and 210 g high boiling aromatic-free mineral oil were intimately mixed on a three roll mill. Into this varnish was added 100 g of the luminophore according to Example 1 and 100 g of a color pigment for obtaining a particular color tone e.g. Permanent Yellow H10G, Hansa Red 3B, Hostaperm Green 8G or Hostaperm Blue AR (all registered Trade Marks of the firm Hoechst). In each case a printing ink colored intensively corresponding to the colouring pigment was obtained.

For achieving lighter color tones the proportion of the color pigment was diminished and in place of the luminophore according to Example 1 that of Example 8 used.

Varnish, color pigment and luminophore were intimately mixed on the three roll mill. The printing inks obtained showed themselves to be suited for bank note guilloche printing without adding line overlappings and loops.

Figure 6:
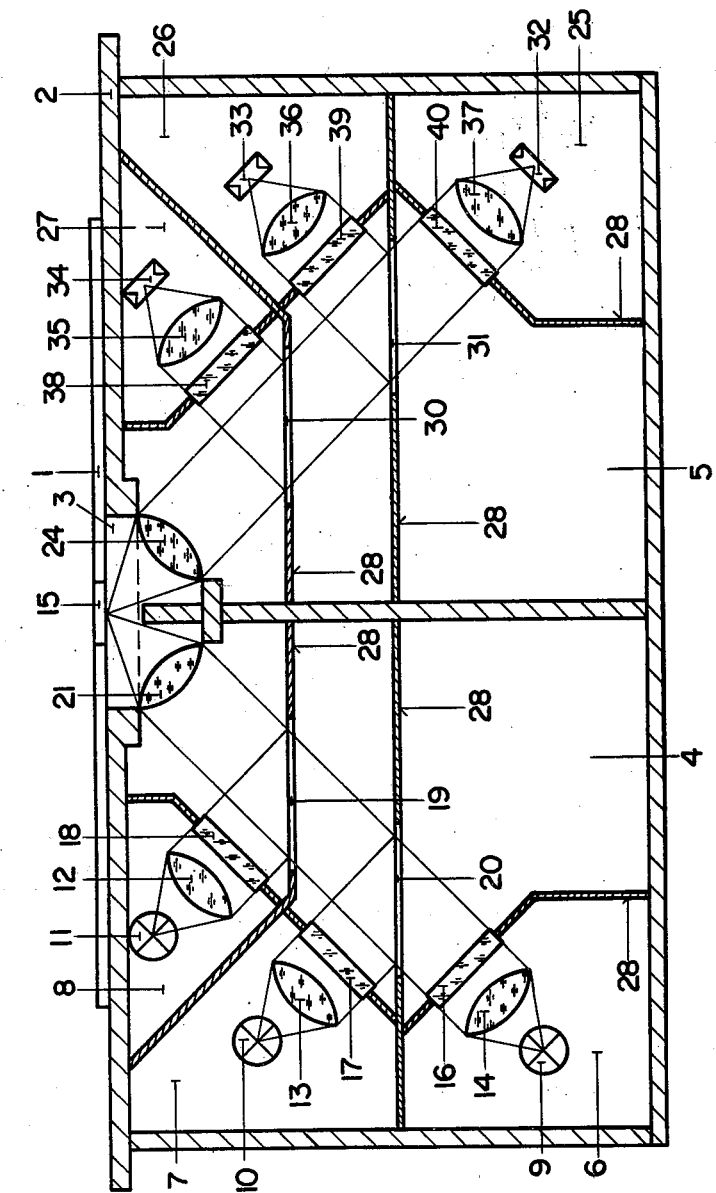
FIG. 6 is a schematic representation of a test device for authenticity determination.

A suitable testing apparatus for authenticity determination of the luminophores is evident from FIG. 6. In this a bank note 1 to be tested is brought by means of a transport device not illustrated on to a table 2 above a window 3. From the window 3 emerges focussed excitation light which derives from the illumination units 6, 7 and 8. The illumination units consist of lamps 9, 10 and 11, lenses 14, 13 and 12 which convert the light emerging from each of the operated lamps 9, 10 or 11 into a parallel beam and interference filters 16, 17 and 18 which of the light of the lamps 9, 10 and 11 allow in each case only the desired spectral region to pass through to the testing region of the bank note. The spectral emission of the lamps 9, 10 and 11 must be chosen accordingly in such a way that the spectral region determined by each of the interference filters 16, 17 and 18 is covered as evenly as possible with light radiation.

The light passing from the illumination units 6, 7 and 8 through the interference filters 16, 17 and 18 is guided via dichroic mirrors 19 and 20 to the collecting lens 21 and through this focussed into the test region 15 of the bank note 1. Intermediate walls 28 take care that exclusively the light filtered through the interference filters reaches the testing region 15 of the bank note and stray light is suppressed.

By means of the excitation light focussed by the collecting lens 21 into the testing region 15, the luminescence materials located in the testing region are excited to emission when this is possible on the basis of the luminescence properties of the material.

The radiation emitted from the luminescence materials is projected via a further collecting lens 24 into a likewise closed chamber 5 in which several light receiver units 25, 26 and 27 are arranged. Similarly to the construction of the illumination units 6, 7 and 8, also the light receiving units are separated from one another by intermediate walls 28. By means of dichroic mirrors 30 and 31 the radiation coming from the test region 15 is split up in such a way that on to each of the photo detectors 32, 33 and 34 part of the emitted radiation can be focussed with the aid of collecting lenses 37, 36 and 35. By means of the interference filters 40, 39 and 38 it is ensured that only radiation of an exactly defined wavelength region is received by the photo detectors.

The device illustrated allows a luminophore located in the test region 15 to be irradiated with different excitation radiations from exactly defined wavelength regions matched thereto as desired. With the aid of the light receiver units arranged in the chamber 5, the radiation emitted from the luminophore can additionally likewise be received divided into exactly defined different wavelength regions and can be measured.

If one times by means of a non-illustrated control unit the individual illumination units of the series and detects the radiation emitted from the test region 15 synchronously timed by means of the light receiving units, then in predetermined regions any emission spectrum can be evaluated relative to up to 9 measuring values with very high reliability and it can be identified. The 9 measuring values correspond to a $3 \times 3$ matrix which arises if one for each of the three excitations determines the emission in the three spectrally limited measuring regions.

As well as the already noted advantage that in the apparatus described no moving parts are used, by which the functionability could be adversely influenced or the liability to damage increased, one obtains by the fixed position arrangement of all components the further advantage of simple and secure in operation arrangement and adjustment of all components. Furthermore by the testing of a "spectral matrix" a particularly simple and particularly certain identification of luminophores is given. Since a luminescent material already with three or four of the possible tests can be identified relatively unambiguously, one finds with the arrangement shown in FIG. 6 a test device which alone by means of control technical measures (software) enables optimal matching to the most varied luminescent materials. In the individual matching for individual testing on a luminophore to be identified in this connection is advantageous not only to undertake the testing of spectral emission maxima but also to detect the presence of characteristic minima with narrow band luminescent materials if necessary directly adjacent the maxima.

Because of the large number of filters in the various channels from the arrangement and the presence of the optical component elements no direct conclusion concerning the feature material to be tested is possible. This constitutes an additional protection against the spying out of the properties of the feature. By simple change of the individual test matrices which are matched to a luminescence material and stored in a respective test programme, changing for another luminescence material is also possible. Mechanical action on the test optics is not necessary for this.

We claim:

1. A security document with authenticity features, comprising: a substrate material, a luminescing substance on said carrier material, said luminescing substance comprising a host lattice doped with a rare earth metal, wherein said host lattice absorbs radiation in the visible region and is excited in at least one of the visible and near infrared regions and has an opticaly translucent region in the invisible optical spectrum in which said luminescing substance emits, and wherein the emission lines of the dopant are such that said host lattice absorbs radiation emitted by said dopant at least in the regions of the visible region whereby each emission from said dopant in the visible region is suppressed.

2. Security document according to claim 1, wherein said host lattice is excited in substantial portions of at least one of the visible range and near infrared range.

3. Security document according to claim 1, wherein the host lattice is a mixed lattice of a lattice absorbing in the visible region and a non-absorbing lattice of the same structure.

4. Security document according to claim 1, wherein said host lattice is doped with ions of the rare earth metals of atomic number 58 to 71.

5. Security document according to claim 3, wherein the proportion of absorbing to non-absorbing host lattice components determines the absorption ability of said luminescing substance.

6. Security document according to claim 1, wherein the optically translucent region lies between 0.8 and 10 μm.

7. Security document according to claim 6, wherein the optically translucent region lies between 1.1 and 10 μm.

8. Security document according to claim 1, wherein the host lattice includes absorbing elements comprising transition metal ions.

9. Security document according to claim 8, wherein said absorbing elements comprise metals of the sub groups VI, VII or VIII.

10. Security document according to claim 9, wherein said absorbing elements comprise cobalt, nickel, manganese or iron.

11. Security document according to claim 8, wherein the host lattice has a structure selected from the group consists of a garnet structure, a perovskite structure and ferrite structure.

12. Security document according to claim 11, wherein the garnet structure can be described by the general formula $$A_3X_{5-2x}M_xM'_xO_{12}$$

wherein
A represents an element selected from the group consisting of the rare earth metals with the exception of neodymium, praseodymium and lathanum, and their mixtures with one another or with lanthanum, praseodymium, neodymium and bismuth,
X represents a metal selected from the group consisting of iron, aluminum, gallium and indium,
M represents a metal selected from the group consisting of iron, cobalt, nickel, manganese and zinc,
M' represents an element selected from the group consisting of silicon, germanium, tin and zirconium
and the index x has a value 0≦x<2.5.

13. Security document according to claim 12, wherein the host lattice is $Y_3Fe_4Ni_{0.5}Ge_{0.5}O_{12}$.

14. Security document according to claim 11, wherein the garnet structure can be described by the general formula $$A_{3-x}B_xX_{5-x}M_xO_{12}$$

wherein
A represents an element from the group consisting of the rare earth metals with the exception of neodymium, praseodymium and lanthanum and their mixtures with one another or with neodymium, praseodymium, lanthanum and bismuth,
B represents an element selected from the group consisting of magnesium, calcium, strontium, barium, manganese, zinc and cadmium,
X represents a metal selected from the group consisting of iron, aluminum, gallium and indium,
M represents an element selected from the group consisting of silicon, germanium, tin, tellurium, zirconium and titanium
and the index x has a value 0<x≦3.

15. Security document according to claim 14, wherein the host lattice is $Y_2CaFe_4SiO_{12}$.

16. Security document according to claim 14, wherein the garnet structure can be described by the general formula $$A_3Fe_{5-x}M_xO_{12}$$

wherein
A represents an element from the group consisting of the rare earth metals with the exception of neodymium, praseodymium and lanthanum, and their mixtures with one another or with neodymium, praseodymium, lanthanum and bismuth
M represents a metal selected from the group consisting of aluminum, gallium, indium and chromium,
and the index x has a value 0≦x<5.

17. Security document according to claim 16, wherein the host lattice is $Y_3Fe_3AL_2O_{12}$.

18. Security document according to claim 11, wherein the garnet structure can be described by the general formula $$A_{3-2x}B_{2x}X_{5-x}V_xO_{12}$$

wherein
A represents an element selected from the group consisting of the rare earth metals with the exception of neodymium, praseodymium and lanthanum, and their mixtures with one another or with neodymium, praseodymium, lanthanum and bismuth,
B represents an element selected from the group consisting of magnesium, calcium, strontium and barium,
X represents an element selected from the group consisting of aluminum, gallium, indium and iron
and the index x has a value between 0≦x<1.5.

19. Security document according to claim 18, wherein the host lattice is $Y Ca_2Fe_4VO_{12}$.

20. Security document according to claim 11, wherein the host lattice has a perovskite structure according to the general formula $$AXO_3$$

wherein
A represents an element selected from the group consisting of the rare earth metals, bismuth, and a combination of a rare earth metal and bismuth; and
X represents one or more absorbing transition metals.

21. Security document according to claim 11, wherein the host lattice has a ferrite structure according to the general formula $$M_{1-x}^{2+}M'^{3+}_xFe_x^{2+}Fe_{2-x}^{3+}O_4$$

wherein
M stands for one or more divalent metals selected from the group consisting of indium, cadmium, cobalt, manganese, iron, nickel, copper and magnesium,
M' stands for one or more trivalent lanthanides (atomic number 58-71), and the index x has a value of between 0 and 1.

22. Security document according to claim 1, including a printing ink on said substrate, and wherein said luminescing substance is mixed into said printing ink.

23. Security document according to claim 22, wherein said luminescing substance has an absorption ability dependent on the lightness of said printing ink used such that substantially no adulteration of the printing ink arises.

24. Security document according to claim 23, wherein the luminescing substance has a small absorption ability and said ink is very light.

25. Security document according to claim 23, wherein the luminescing substance has a relatively high absorption ability and said ink is dark.

26. Security document according to claim 1, wherein the luminescing substance is mixed into said substrate material composition.

27. Security document according to claim 1, wherein the luminescing substance is provided at least partly in large areas of said substrate material.

28. Security document according to claim 27, wherein the luminescing substance comprises strips.

29. Security document according to claim 1, wherein the luminescing substance comprises an invisible layer at least partly covering the carrier material.

30. Security document according to claim 26, wherein the luminescing substance is present in the bulk of the substrate material on correspondingly prepared mottling fibers.

31. Security document according to claim 26, wherein the luminescing substance is present in the bulk of the substrate material on a correspondingly prepared security thread.

32. Security document according to claim 1, wherein the excitation spectrum is matched to the emission spectrum of an illuminating test lamp such that said luminescent substance absorbs substantially all frequencies of radiation emitted by said lamp.

33. Security document according to claim 1, wherein said luminescent substance is a powder having a particle size less than 1 $\mu$m.

* * * * *